(12) United States Patent
Moniz et al.

(10) Patent No.: US 10,113,556 B2
(45) Date of Patent: Oct. 30, 2018

(54) CENTRIFUGAL COMPRESSOR ASSEMBLY FOR USE IN A TURBINE ENGINE AND METHOD OF ASSEMBLY

(71) Applicant: General Electric Company, Schenectady, NY (US)

(72) Inventors: Thomas Ory Moniz, Loveland, OH (US); Joseph George Rose, Mason, OH (US)

(73) Assignee: General Electric Company, Schenectady, NY (US)

( * ) Notice: Subject to any disclaimer, the term of this patent is extended or adjusted under 35 U.S.C. 154(b) by 359 days.

(21) Appl. No.: 14/991,491

(22) Filed: Jan. 8, 2016

(65) Prior Publication Data
US 2017/0198709 A1    Jul. 13, 2017

(51) Int. Cl.
| | |
|---|---|
| *F04D 29/08* | (2006.01) |
| *F04D 29/42* | (2006.01) |
| *F04D 17/02* | (2006.01) |
| *F04D 27/02* | (2006.01) |
| *F04D 29/16* | (2006.01) |
| *F02C 9/16* | (2006.01) |

(52) U.S. Cl.
CPC ............ *F04D 29/4206* (2013.01); *F02C 9/16* (2013.01); *F04D 17/025* (2013.01); *F04D 27/0246* (2013.01); *F04D 29/162* (2013.01); *F05B 2220/302* (2013.01); *F05B 2230/60* (2013.01)

(58) Field of Classification Search
CPC .. F04D 29/083; F04D 29/284; F04D 29/4206; F04D 29/582; F04D 27/001; F04D 17/10; F04D 17/025; F02C 9/16
See application file for complete search history.

(56) References Cited

U.S. PATENT DOCUMENTS

| | | |
|---|---|---|
| 5,104,287 A | 4/1992 | Ciokajlo |
| 5,228,828 A | 7/1993 | Damlis et al. |
| 5,685,693 A | 11/1997 | Sexton et al. |
| 6,273,671 B1 | 8/2001 | Ress, Jr. |
| 6,382,905 B1 | 5/2002 | Czachor et al. |
| 7,407,369 B2 | 8/2008 | Schwarz et al. |
| 8,011,883 B2 | 9/2011 | Schwarz et al. |
| 8,087,880 B2 * | 1/2012 | Karafillis ................ F01D 11/22 415/1 |
| 8,256,228 B2 | 9/2012 | O'Leary |

* cited by examiner

*Primary Examiner* — Nathaniel Wiehe
*Assistant Examiner* — Maxime Adjagbe
(74) *Attorney, Agent, or Firm* — General Electric Company; Pamela Kachur

(57) ABSTRACT

A centrifugal compressor assembly for use in a turbine engine is provided. The assembly includes an impeller that includes a plurality of rotor blades. The assembly also includes a stationary assembly circumscribing the impeller such that a clearance is defined therebetween. The stationary assembly includes at least one articulating seal member positioned adjacent the plurality of rotor blades, and a biasing mechanism configured to cause the at least one articulating seal member to selectively translate relative to the plurality of rotor blades based on an operating condition of the turbine engine.

17 Claims, 5 Drawing Sheets

CENTRIFUGAL COMPRESSOR ASSEMBLY FOR USE IN A TURBINE ENGINE AND METHOD OF ASSEMBLY

BACKGROUND

The present disclosure relates generally to turbine engines and, more specifically, to systems and methods of controlling rotor blade clearance in a centrifugal compressor of a gas turbine engine.

Known turbine engines experience several different phases of operation including, but not limited to, start-up, warm-up, steady-state, shutdown, and cool-down. In at least some of such known gas turbines, clearances between rotor blades and inner surfaces of the surrounding seal members are controlled to facilitate improving operating efficiency. Such clearances generally vary as the gas turbine transitions from one operational phase to another. More particularly, each operational phase has different operating conditions associated with it, such as temperature, pressure, and rotational speed, which will induce changes in the clearances between turbine and compressor components, including static and moving components within the gas turbine.

In at least some known gas turbines, the clearances between the rotor blades and the seal members are also controlled to prevent contact-related damage therebetween as the gas turbine transitions between operational phases. For example, in at least some known gas turbines, cold, or assembly, clearances are set to be no larger than required for steady-state operation to account for thermal and mechanical differences in the gas turbine when transitioning between phases of operation. Moreover, as described above, turbine efficiency depends at least in part on the clearance between tips of the rotating blades and seal members coupled to the surrounding stationary components. If the clearance is too large, enhanced gas flow may unnecessarily leak through the clearance gaps, thus decreasing the gas turbine's efficiency. Many known gas turbines include variable clearance mechanisms in the high-pressure turbine section or the low-pressure turbine section. However, it is generally difficult to implement clearance control systems in other sections of the turbine due to the complex geometry of the components.

BRIEF DESCRIPTION

In one aspect, a centrifugal compressor assembly for use in a turbine engine is provided. The assembly includes an impeller that includes a plurality of rotor blades. The assembly also includes a stationary assembly circumscribing the impeller such that a clearance is defined therebetween. The stationary assembly includes at least one articulating seal member positioned adjacent the plurality of rotor blades, and a biasing mechanism configured to cause the at least one articulating seal member to selectively translate relative to the plurality of rotor blades based on an operating condition of the turbine engine.

In another aspect, a gas turbine engine is provided. The gas turbine engine includes a high-pressure compressor including an impeller that includes a plurality of rotor blades, and a stationary assembly circumscribing the impeller such that a clearance is defined therebetween. The stationary assembly includes at least one articulating seal member positioned adjacent the plurality of rotor blades, and a biasing mechanism configured to cause the at least one articulating seal member to selectively translate relative to the plurality of rotor blades based on an operating condition of the turbine engine.

In yet another aspect, a method of assembling a centrifugal compressor assembly for use in a turbofan engine is provided. The centrifugal compressor assembly includes an impeller. The method includes circumscribing the impeller with a stationary assembly such that a clearance is defined therebetween, positioning at least one articulating seal member of the stationary assembly adjacent a plurality of rotor blades of the impeller, and coupling a biasing mechanism to the at least one articulating seal member. The biasing mechanism is configured to cause the at least one articulating seal member to selectively translate relative to the plurality of rotor blades based on an operating condition of the turbine engine.

DRAWINGS

These and other features, aspects, and advantages of the present disclosure will become better understood when the following detailed description is read with reference to the accompanying drawings in which like characters represent like parts throughout the drawings, wherein.

Figure 1:
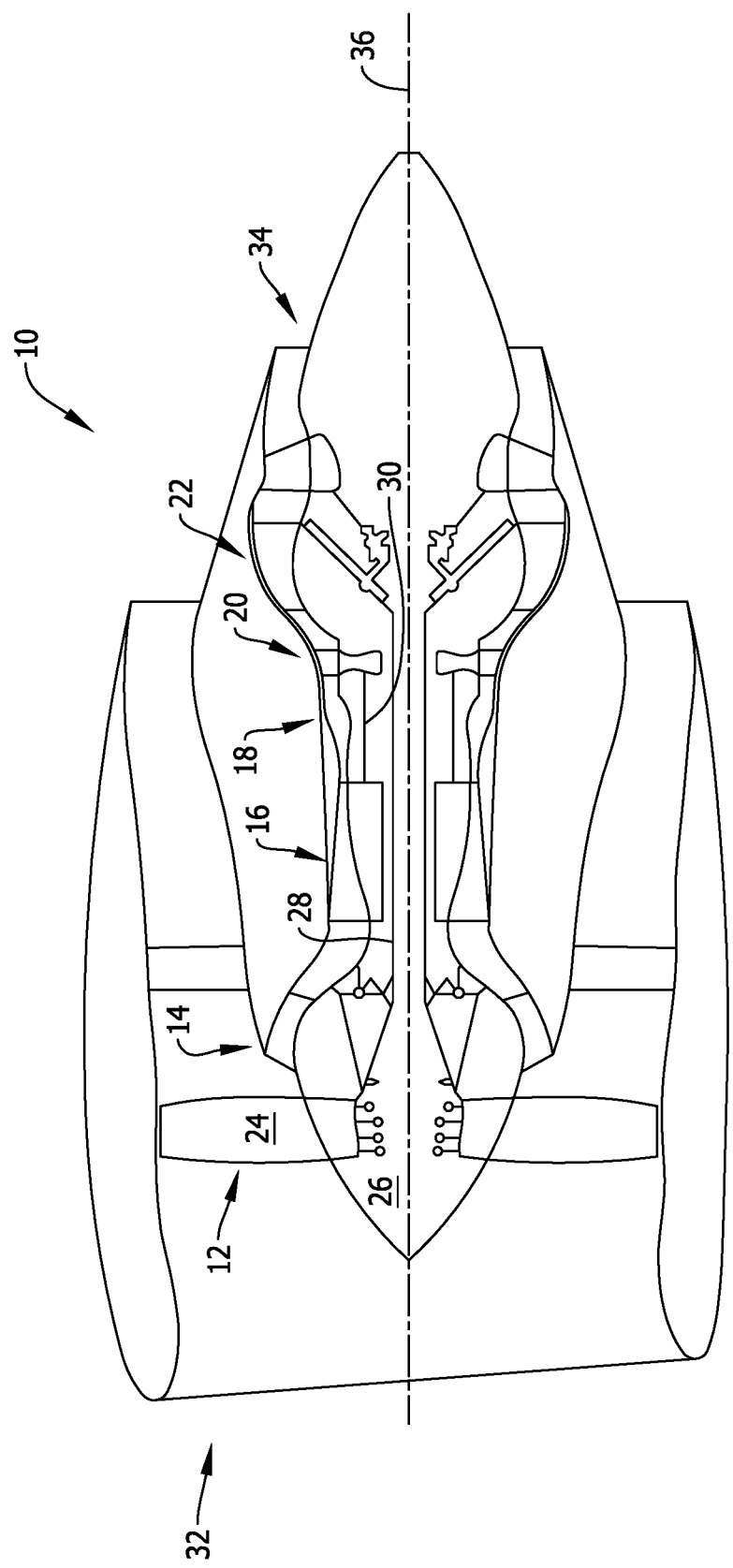
FIG. 1 is a schematic illustration of an exemplary turbofan engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to systems and methods for use in controlling rotor blade clearance in a turbine engine. More specifically, the systems described herein include at least one articulating seal member configured to accommodate variations in the rotor blade clearance in a centrifugal compressor during transient and/or steady-state operational phases of the turbine engine. The articulating seal member is designed to accommodate the complex geometry of rotor blades in the centrifugal compressor. The system also includes a biasing mechanism that selectively translates the articulating seal member radially during transitions between the transient and steady-state operational phases. The biasing mechanism can either be a mechanical, pressurized, or thermal type device for selectively translating the articulating seal member. Moreover, the system includes a feedback sensor capable of determining the clearance between the articulating seal member and the rotor blades. As such, the clearance in a centrifugal compressor is controlled in an accurate and efficient manner, thereby increasing the overall performance and efficiency of the turbine engine.

FIG. 1 is a schematic illustration of an exemplary turbofan engine 10 including a fan assembly 12, a low pressure or booster compressor 14, a high-pressure compressor 16, and a combustor assembly 18. In one embodiment, high-pressure compressor 16 is embodied as a centrifugal compressor assembly. Fan assembly 12, booster compressor 14, high-pressure compressor 16, and combustor assembly 18 are coupled in flow communication. Turbofan engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor 14 through a first drive shaft 28, and high-pressure turbine 20 is coupled to high-pressure compressor 16 through a second drive shaft 30. Turbofan engine 10 has an intake 32 and an exhaust 34. Turbofan engine 10 further includes a centerline 36 about which fan assembly 12, booster compressor 14, high-pressure compressor 16, and turbines 20 and 22 rotate.

In operation, air entering turbofan engine 10 through intake 32 is channeled through fan assembly 12 towards booster compressor 14. Compressed air is discharged from booster compressor 14 towards high-pressure compressor 16. Highly compressed air is channeled from high-pressure compressor 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbofan engine 10 via exhaust 34.

Figure 2:
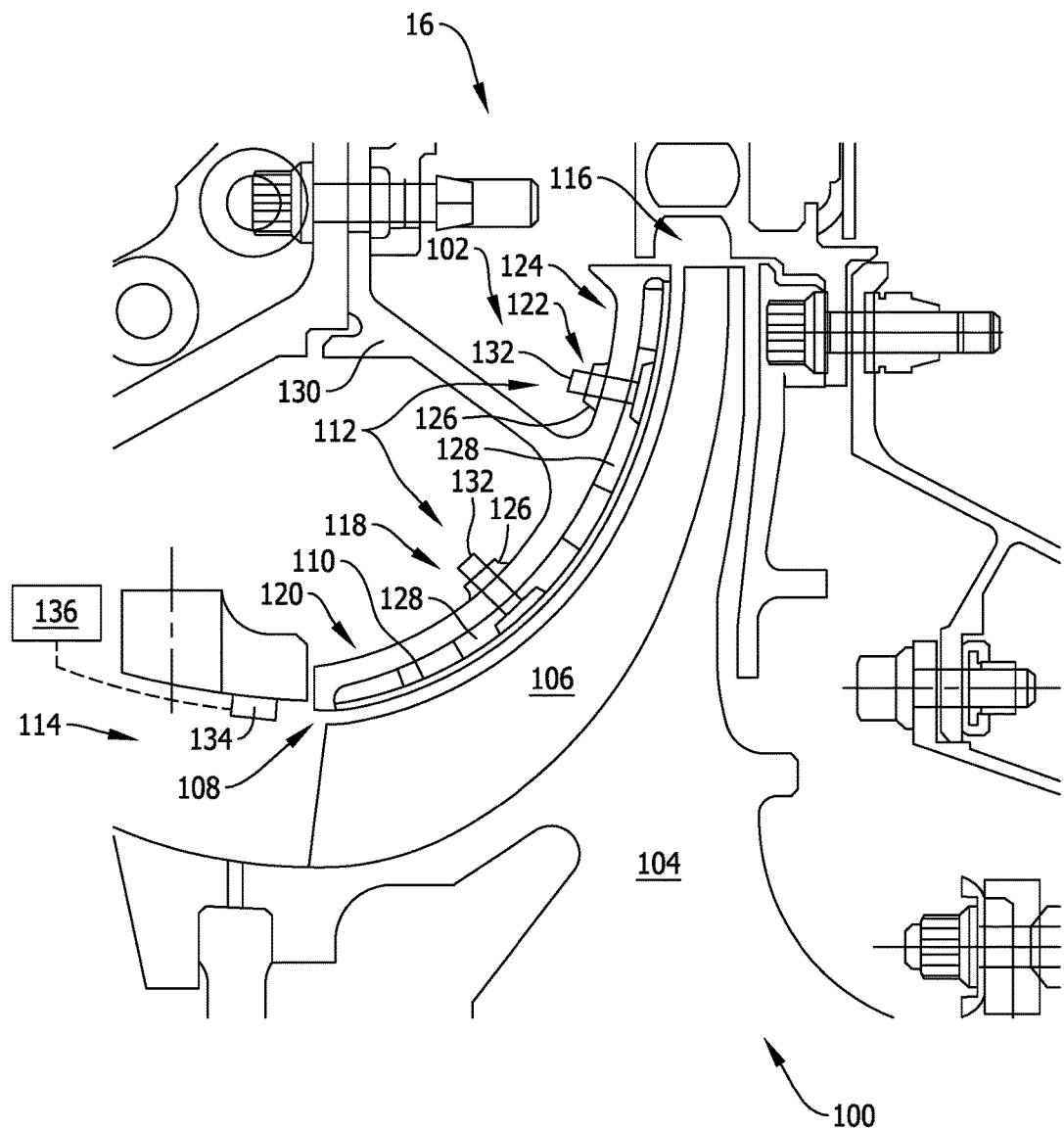
FIG. 2 is a cross-sectional illustration of a high-pressure compressor that may be used in the turbofan engine shown in FIG. 1, in accordance with a first embodiment of the disclosure.

FIG. 2 is a cross-sectional illustration of a high-pressure compressor 16 that may be used in turbofan engine 10 (shown in FIG. 1), in accordance with a first embodiment of the disclosure. In the exemplary embodiment, high-pressure compressor 16 includes an impeller 100 and a stationary assembly 102 circumscribing impeller 100. Impeller 100 that includes a hub 104 and a plurality of rotor blades 106 coupled to hub 104. Rotor blades 106 can be a combination of full and partial (splitter) blades or two tandem rows of blades with moderate-to-high pressure ratio stages.

Stationary assembly 102 circumscribes impeller 100 such that a clearance 108 is defined therebetween. Moreover, stationary assembly 102 includes at least one articulating seal member 110 positioned adjacent rotor blades 106, and a biasing mechanism 112 that causes articulating seal member 110 to selectively translate relative to the plurality of rotor blades 106 based on an operating condition of turbine engine 10. In one embodiment, articulating seal member 110 is embodied as a shroud segment. Causing articulating seal member 110 to selectively translate relative to the plurality of rotor blades 106 facilitates ensuring clearance 108 is no greater than necessary such that gas turbine efficiency is improved. For example, components such as hub 104, rotor blades 106, and articulating seal member 110 expand when heated as turbofan engine 10 transitions between a transient operational phase (for example, a start-up phase and a warm-up phase) and a steady-state operational phase. As a result, clearance 108 will vary as turbofan engine 10 transitions between different operational phases. Clearance 108 may also vary as a result of other operational factors such as vibrational forces and maneuver loads.

In the exemplary embodiment, articulating seal member 110 extends circumferentially relative to impeller 100 about centerline 36 (shown in FIG. 1). Moreover, articulating seal member 110 has an arcuate shape that is complementary to an outer profile of the plurality of rotor blades 106. More specifically, articulating seal member 110 is substantially convex relative to centerline 36. As such, clearance 108 is substantially uniform between an inlet 114 and an outlet 116 of high-pressure compressor 16. In an alternative embodiment, clearance 108 at inlet 114 is slightly smaller than at outlet 116, or vice versa, such that any contact-related abrasion between rotor blades 106 and articulating seal member 110 occurs at a limited location therebetween.

As described above, biasing mechanism 112 causes articulating seal member 110 to selectively translate relative to the plurality of rotor blades 106. In one embodiment, biasing mechanism 112 is a physical actuator coupled to articulating seal member 110. More specifically a first physical actuator 118 is positioned at an inner radial portion 120 of articulating seal member 110, and a second physical actuator 122 is positioned at an outer radial portion 124 of articulating seal member 110. Physical actuators 118 and 122 mechanically selectively translate articulating seal member 110 relative to the plurality of rotor blades 106. Physical actuators 118 and 122 may be any mechanical devices that enables stationary assembly 102 to function as described herein. For example, in the exemplary embodiment, physical actuators 118 and 122 are a screw-type device that include a first retaining member 126 and a second retaining member 128 positioned on opposite sides of an arcuate stationary member 130. Second retaining member 128 is coupled to articulating seal member 110 such that second retaining member 128 and articulating seal member 110 translate together. A threaded member 132 extends through stationary member 130 and is coupled between first retaining member 126 and second retaining member 128. As such, in operation, physical actuators 118 and 122 cause articulating seal member 110 to selectively translate based on a degree of rotation and a direction of rotation of threaded member 132. Moreover, first physical actuator 118 and second physical actuator 122 may be either activated alone or in combination to selectively translate articulating seal member 110. When activated alone, articulating seal member 110 is deflected to control clearance 108.

In the exemplary embodiment, high-pressure compressor 16 further includes a feedback sensor 134 and a controller 136 coupled in communication with feedback sensor 134 and biasing mechanism 112. Feedback sensor 134 is positioned to determine clearance 108 between the plurality of rotor blades 106 and articulating seal member 110, and controller 136 dynamically actuates articulating seal member 110 based on feedback received from feedback sensor 134. As used herein, "dynamic actuation" refers to the act of translating articulating seal member 110 in real-time or near real-time based on feedback received from feedback sensor 134. Exemplary feedback sensors include, but are not limited to, clearance proximity sensors such as a microwave sensor, a capacitive sensor, or an optical fiber sensor.

Figure 3:
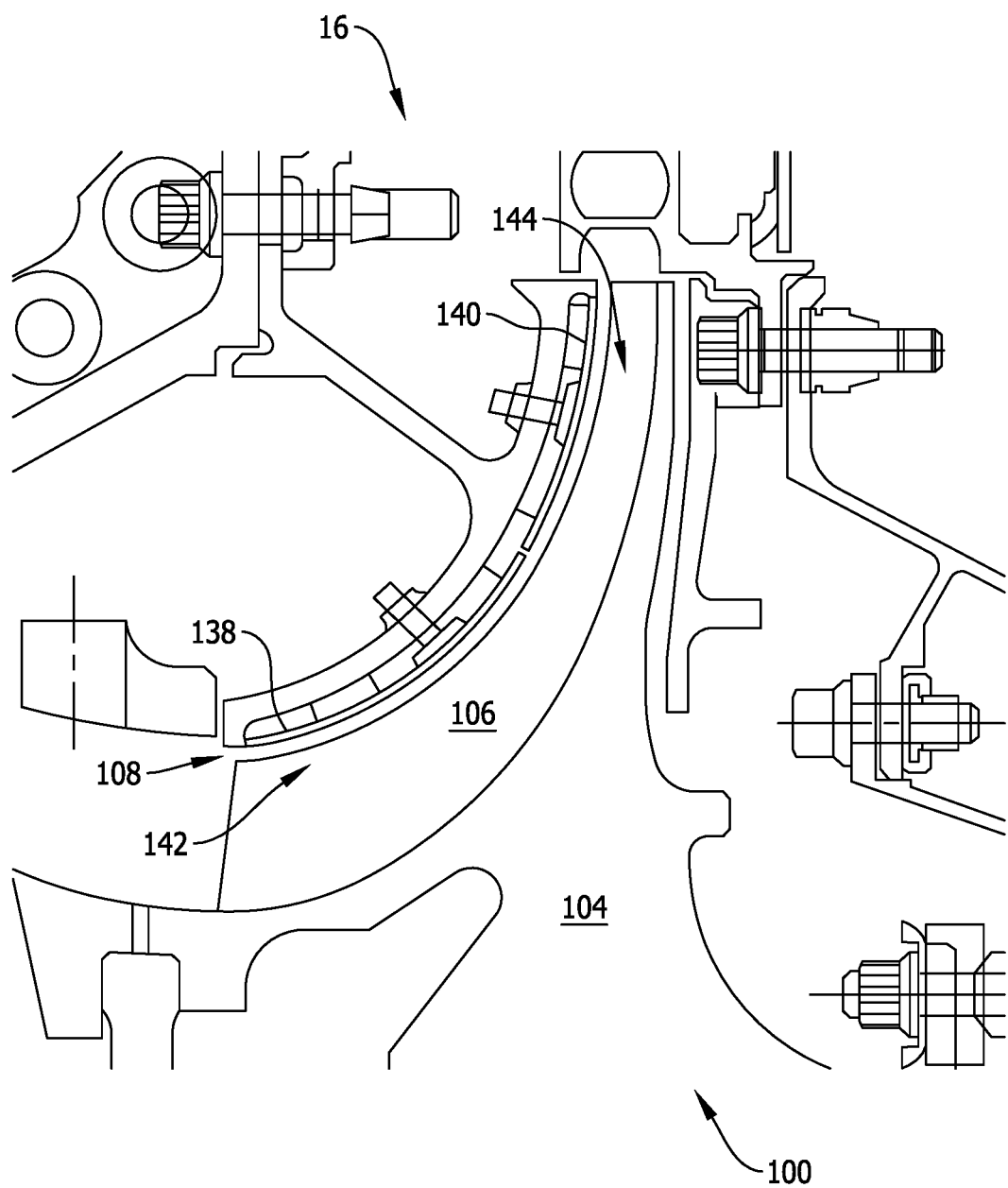
FIG. 3 is a cross-sectional illustration of a high-pressure compressor that may be used in the turbofan engine shown in FIG. 1, in accordance with a second embodiment of the disclosure.

FIG. 3 is a cross-sectional illustration of high-pressure compressor 16 that may be used in turbofan engine 10 (shown in FIG. 1), in accordance with a second embodiment of the disclosure. In the exemplary embodiment, the at least one articulating seal member includes a first articulating seal member 138 and a second articulating seal member 140. The at least one articulating seal member is split into first articulating seal member 138 and second articulating seal member 140 to enable selective and free translation of either first articulating seal member 138 or second articulating seal member 140 relative to one another. First articulating seal member 138 extends along an inner radial portion 142 of impeller 100, and second articulating seal member 140 extends along an outer radial portion 144 of impeller 100. Each of first articulating seal member 138 and second articulating seal member 140 extend circumferentially relative to impeller 100 about centerline 36 (shown in FIG. 1).

Figure 4:
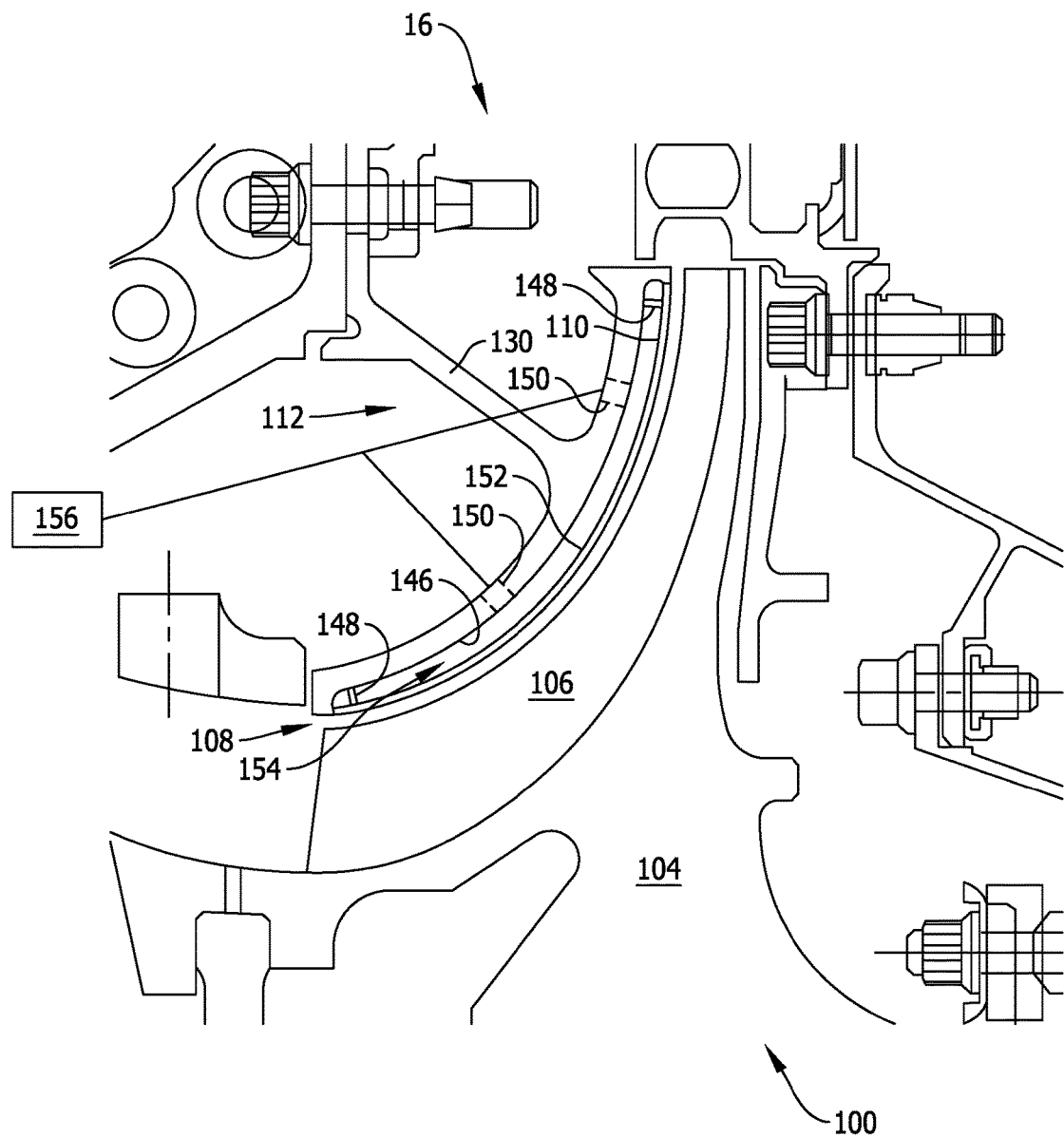
FIG. 4 is a cross-sectional illustration of a high-pressure compressor that may be used in the turbofan engine shown in FIG. 1, in accordance with a third embodiment of the disclosure.

FIG. 4 is a cross-sectional illustration of high-pressure compressor 16 that may be used in turbofan engine 10 (shown in FIG. 1), in accordance with a third embodiment of the disclosure. In the exemplary embodiment, biasing mechanism 112 includes stationary member 130 having a first sealing surface 146. Articulating seal member 110 is coupled to stationary member 130 with a biasing member 148 that biases articulating seal member 110 towards stationary member 130 with a predetermined amount of force. Stationary member 130 also includes at least one flow aperture 150 defined therein. Articulating seal member 110 includes a second sealing surface 152, and is positioned relative to stationary member 130 such that an interface 154 is defined between first sealing surface 146 and second sealing surface 152. Moreover, biasing mechanism 112 includes a fluid source 156 such as fan assembly 12 or booster compressor 14 (each shown in FIG. 1).

In operation, fluid source 156 channels pressurized fluid through flow aperture 150 and within interface 154 such that articulating seal member 110 biases relative to stationary member 130. More specifically, the pressurized fluid pressurizes interface 154 such that the predetermined amount of force induced by biasing member 148 is overcome, and articulating seal member 110 selectively translates relative to the plurality of rotor blades 106. As such, clearance 108 is controlled by the pressurization between first sealing surface 146 and second sealing surface 152.

Figure 5:
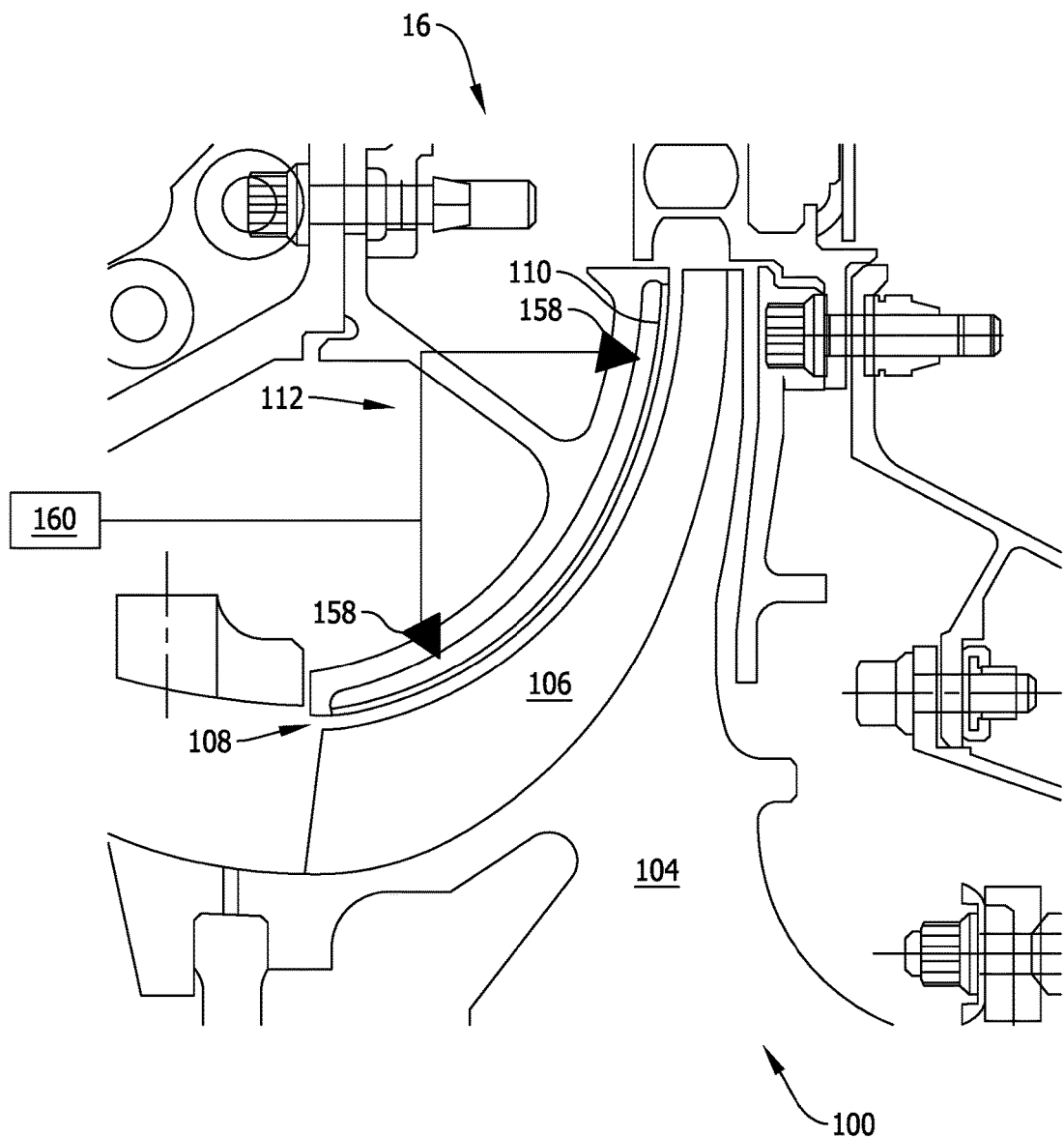
FIG. 5 is a cross-sectional illustration of a high-pressure compressor that may be used in the turbofan engine shown in FIG. 1, in accordance with a fourth embodiment of the disclosure.

FIG. 5 is a cross-sectional illustration of high-pressure compressor 16 that may be used in turbofan engine 10 (shown in FIG. 1), in accordance with a fourth embodiment of the disclosure. In the exemplary embodiment, biasing mechanism 112 includes a nozzle 158 extending through stationary member 130. Nozzle 158 receives fluid from a fluid source 160, and discharges fluid towards articulating seal member 110. The temperature of the fluid to be discharged towards articulating seal member 110 is selected based on the operating condition of turbofan engine 10. For example, either comparatively hot fluid or comparatively cold fluid is discharged from articulating seal member 110 to control the thermal expansion and/or contraction of articulating seal member 110. As such, no moving parts are required to selectively translate articulating seal member 110 and control clearance 108.

An exemplary technical effect of the system and methods described herein includes at least one of: (a) actively controlling the clearance between stationary and rotating components in a centrifugal compressor; (b) improving compressor performance; and (c) improving turbine engine efficiency.

Exemplary embodiments of a turbofan engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan engines and related methods as described herein. Rather, the exemplary embodiment can be implemented and utilized in connection with many applications where improving turbine engine efficiency is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A centrifugal compressor assembly for use in a turbine engine, said assembly comprising:
   an impeller that comprises a plurality of rotor blades; and
   a stationary assembly circumscribing said impeller such that a clearance is defined therebetween, wherein said stationary assembly comprises:
      at least one articulating seal member positioned adjacent said plurality of rotor blades;
      a biasing mechanism configured to cause said at least one articulating seal member to selectively translate relative to said plurality of rotor blades based on an operating condition of the turbine engine; and wherein said at least one articulating seal member comprises a first articulating seal member and a second articulating seal member, said first articulating seal member extending along an inner radial portion of said impeller and said second articulating seal member extending along an outer radial portion of said impeller.

2. The assembly in accordance with claim 1, wherein said at least one articulating seal member extends circumferentially relative to said impeller.

3. The assembly in accordance with claim 1, wherein said at least one articulating seal member has an arcuate shape that is complementary to an outer profile of said plurality of rotor blades.

4. The assembly in accordance with claim 1 further comprising:
 a feedback sensor configured to determine the clearance between said plurality of rotor blades and said at least one articulating seal member; and
 a controller coupled in communication with said feedback sensor and said biasing mechanism, said controller configured to dynamically actuate said at least one articulating seal member based on feedback received from said feedback sensor.

5. The assembly in accordance with claim 1, wherein said biasing mechanism comprises a physical actuator coupled to said at least one articulating seal member, said physical actuator configured to mechanically selectively translate said at least one articulating seal member relative to said plurality of rotor blades.

6. The assembly in accordance with claim 1, wherein said biasing mechanism comprises:
 a stationary member comprising a first sealing surface, wherein said at least one articulating seal member comprises a second sealing surface and is positioned relative to said stationary member such that an interface is defined between said first sealing surface and said second sealing surface; and
 a fluid source configured to channel pressurized fluid within the interface such that said at least one articulating seal member biases relative to said stationary member.

7. The assembly in accordance with claim 1, wherein said biasing mechanism comprises a nozzle configured to discharge fluid onto said at least one articulating seal member to control thermal expansion and contraction of said at least one articulating seal member.

8. A gas turbine engine comprising:
 a high-pressure compressor comprising:
  an impeller that comprises a plurality of rotor blades; and
  a stationary assembly circumscribing said impeller such that a clearance is defined therebetween, wherein said stationary assembly comprises:
   at least one articulating seal member positioned adjacent said plurality of rotor blades; and
   a biasing mechanism configured to cause said at least one articulating seal member to selectively translate relative to said plurality of rotor blades based on an operating condition of the turbine engine;
  wherein said at least one articulating seal member comprises a first articulating seal member and a second articulating seal member, said first articulating seal member extending along an inner radial portion of said impeller and said second articulating seal member extending along an outer radial portion of said impeller.

9. The gas turbine engine in accordance with claim 8, wherein said at least one articulating seal member extends circumferentially relative to said impeller.

10. The gas turbine engine in accordance with claim 8, wherein said at least one articulating seal member has an arcuate shape that is complementary to an outer profile of said plurality of rotor blades.

11. The gas turbine engine in accordance with claim 8 further comprising:
 a feedback sensor configured to determine the clearance between said plurality of rotor blades and said at least one articulating seal member; and
 a controller coupled in communication with said feedback sensor and said biasing mechanism, said controller configured to dynamically actuate said at least one articulating seal member based on feedback received from said feedback sensor.

12. The gas turbine engine in accordance with claim 8, wherein said biasing mechanism comprises a physical actuator coupled to said at least one articulating seal member, said physical actuator configured to mechanically selectively translate said at least one articulating seal member relative to said plurality of rotor blades.

13. The gas turbine engine in accordance with claim 8, wherein said biasing mechanism comprises:
 a stationary member comprising a first sealing surface, wherein said at least one articulating seal member comprises a second sealing surface and is positioned relative to said stationary member such that an interface is defined between said first sealing surface and said second sealing surface; and
 a fluid source configured to channel pressurized fluid within the interface such that said at least one articulating seal member biases relative to said stationary member.

14. The gas turbine engine in accordance with claim 8, wherein said biasing mechanism comprises a nozzle configured to discharge fluid onto said at least one articulating seal member to control thermal expansion and contraction of said at least one articulating seal member.

15. A method of assembling a centrifugal compressor assembly for use in a turbofan engine, the centrifugal compressor assembly including an impeller, said method comprising:
 circumscribing the impeller with a stationary assembly such that a clearance is defined therebetween;
 positioning at least one articulating seal member of the stationary assembly adjacent a plurality of rotor blades along an inner radial portion of the impeller;
 positioning a second articulating seal member along an outer radial portion of the impeller; and
 coupling a biasing mechanism to the at least one articulating seal member, the biasing mechanism configured to cause the at least one articulating seal member to selectively translate relative to the plurality of rotor blades based on an operating condition of the turbine engine.

16. The method in accordance with claim 15, wherein positioning the at least one articulating seal member comprises extending the at least one articulating seal member circumferentially relative to the impeller.

17. The method in accordance with claim 15, wherein coupling the biasing mechanism comprises coupling a physical actuator to the at least one articulating seal member, the physical actuator configured to mechanically selectively translate the at least one articulating seal member relative to the plurality of rotor blades.

\* \* \* \* \*